United States Patent [19]
Patrick

[11] Patent Number: 5,892,187
[45] Date of Patent: Apr. 6, 1999

[54] TUNABLE RECYCLABLE HEADLINER

[75] Inventor: William P. Patrick, Glastonbury, Conn.

[73] Assignee: United Technologies Corporation, Hartford, Conn.

[21] Appl. No.: 992,226

[22] Filed: Dec. 17, 1997

[51] Int. Cl.$^6$ ..................................................... E04B 1/82
[52] U.S. Cl. ............................................ 181/286; 181/290
[58] Field of Search .................................. 181/284, 286, 181/287, 290, 291, 292, 293, 294, 295

[56] References Cited

U.S. PATENT DOCUMENTS

| | | |
|---|---|---|
| 1,554,180 | 9/1925 | Trader . |
| 2,052,605 | 9/1936 | Clark et al. . |
| 2,069,413 | 2/1937 | Leadbetter . |
| 2,077,889 | 4/1937 | Mazer . |
| 2,142,463 | 1/1939 | Upson . |
| 3,384,199 | 5/1968 | Eckel ........................................ 181/290 |
| 3,396,070 | 8/1968 | Gambill et al. . |
| 4,097,633 | 6/1978 | Focht ........................................ 181/294 |
| 4,515,329 | 5/1985 | Blatt et al. ............................... 181/290 |
| 4,741,945 | 5/1988 | Brant et al. . |
| 4,886,696 | 12/1989 | Bainbridge .............................. 181/292 |
| 5,509,247 | 4/1996 | Fortez et al. . |

OTHER PUBLICATIONS

Dobrasevic, Z. D. et al. "Acoustic Material Application in Vehicles." Jun. 3–4, 1996, Amway Grand Plaza Hotel, Grand Rapids, MI, pp. 1–39.

Ozeki, Toshihito et al. "Development of New Headliner Base Materials and the Manfacturing Process." *SAE International*, International Congress and Exposition, Detroit, Michigan, Mar. 1–5, 1993, SAE Technical Paper Series 930303, pp. 1–11.

Pikula, Daniel G. et al. "Acoustical Evaluation of Automotive Headliner Composites with Various Adhesive Systems." *SAE International*, International Congress and Exposition, Detroit, Michigan, Feb. 24–28, 1992, SAE Technical Paper Series 920501, pp. 83–93.

Kiyota, Yuichi et al. "Low Frequency Noise Reduction by Improving Sound Insulation Materials."P–291 Proceedings of the 1995 Noise and Vibration Conference Series, SAE 951241, pp. 57–62.

*Primary Examiner*—Khanh Dang
*Attorney, Agent, or Firm*—Pamela J. Curbelo

[57] ABSTRACT

The sound attenuating device of the present invention is a bulk layer connected to a support member which forms a plurality of Helmholtz resonators. This invention is particularly useful in a vehicle where the bulk layer attenuates high frequency noise, i.e. above about 1000 Hz, while the resonators can be tuned across the device to absorb at different lower frequencies in different areas of the device.

20 Claims, 2 Drawing Sheets

TUNABLE RECYCLABLE HEADLINER

TECHNICAL FIELD

The present invention relates generally to acoustical attenuating devices and especially to acoustical panels, such as automotive headliners, for attenuating noise within the passenger cabin of an automobile. More particularly, the invention relates to a vehicle headliner having resonant chambers which can be tuned to absorb a specific frequency or frequencies.

BACKGROUND OF THE INVENTION

Headliners have been used in numerous passenger enclosures, such as passenger vehicles, in order to attenuate sound within the vehicle and to prevent transmission of sound through the roof thereof. Conventionally, headliners were either single or multi-layered structures of a fibrous or foam material having an outside layer visible in the cabin, typically of cloth or soft material, and a backing layer of a relatively strong, reinforced paper or plastic material, which could be adhered to the roof of the cabin.

Due to economics and environmental restrictions on vehicle manufacturers, headliner manufacturers are constantly under pressures to reduce headliner weight while improving the recyclability and strength of the headliners. Wholly recyclable headliners improve the environmental compatibility of the vehicle, reduced weight headliners reduce the operating expense of the vehicle by improving the gas mileage thereof, while improved strength headliners reduce the cost of the vehicle by allowing the accessories such as dome lights, visors, mirrors and the like, to be installed directly into the headliners.

In addition to economics and environmental restrictions effecting the manufacture of headliners, vehicle customer demands with relation to noise control also significantly affect the design thereof. Vehicle manufacturers need the ability to control different frequency noises within different portions of the cabin in order to meet customer demands. Therefore, what is needed in the art is a tunable, recyclable, acoustical panel or headliner for use in automobiles and other vehicles.

SUMMARY OF INVENTION

It is therefore an object of the present invention to provide an improved acoustical attenuating device which can control sound energy or noise at different frequencies.

Another object of the invention is to provide such an acoustical attenuating device which is tunable to a specific frequency or frequencies.

Still another object of the invention is to provide an acoustical headliner for a passenger vehicle which can absorb different frequency sound waves within different parts of the vehicle cabin.

A more specific object of the invention is to provide such an acoustical headliner for a passenger vehicle which is relatively strong and able to support various vehicle accessories, which is recyclable and therefore compatible with today's environmental restrictions, and which is significantly lighter in weight than prior devices of equivalent size or dimension, thereby improving gas mileage and reducing vehicle operating expense.

Broadly, the present invention is directed to an acoustical attenuating device comprising a bulk layer capable of absorbing noise at one frequency and a plurality of resonators which are tuned to absorb noise at a different frequency or frequencies.

The resonators are preferably Helmholtz resonators having at least one orifice and a volume and are embedded within a support member which provides both strength and rigidity to the device.

The bulk layer, typically composed of a fibrous filler material, absorbs noise at a frequency related to the layer thickness. Absorption of low frequency noise ordinarily requires a relatively thick bulk layer. However, in the acoustical attenuating device according to the invention, the plurality of resonators are tuned to absorb these low frequency noises. Consequently, it is possible to employ bulk layers of reduced or limited thickness. This significantly reduces the overall thickness and weight of the device and, in the case of vehicle headliners, greatly improves the manufacturing costs as well as the operating expense of the vehicle.

The tuned or resonant frequency of the resonators is set by their geometry including the volume of the resonator cavity, the diameter or area of the orifice, the number of orifices per cavity and the thickness of the material in the vicinity of the orifice. To lower the resonant frequency, the resonator cavity can be made larger, the orifice can be made smaller or the thickness of the material around the orifice can be increased. An acoustical attenuating device or headliner according to the invention can be tuned to absorb noises at much lower frequencies than can be achieved by conventional devices of the same thickness.

The resonators according to the invention are embedded within a support member to which the bulk layer is suitably attached by an adhesive or other means. The support member is typically formed from a single sheet which has been embossed with a plurality of cavities open on the side of the sheet opposite the bulk layer. The sheet is further provided with a plurality of orifices, at least one of which communicates with each cavity. A backing sheet or other member is applied to the opposite side of the support member and covers the cavities, defining together with cavities and orifices a plurality of resonant chambers or resonators for absorbing noise at a frequency which is different, and in the case of a vehicle, preferably lower than that of the noise absorbed by the bulk layer.

The backing sheet may be a separate member or, in the case of a vehicle headliner, it may be the roof of the vehicle to which the headliner is applied. A facing sheet may also be adhered to the outer surface of the bulk layer for aesthetic purposes.

The entire acoustical attenuating device according to the invention can be made from wholly recyclable materials and is therefore environmentally compatible. As mentioned, the acoustical attenuating device may be a vehicle headliner for reducing noise inside an automobile or it may be an acoustical panel for attenuating noise in other structures such as a factory, airport, or other building.

The foregoing and other objects, features and advantages of the present invention will become more apparent from the following detailed description of exemplary embodiments thereof taken in connection with the accompanying drawings.

BEST MODE FOR CARRYING OUT THE INVENTION

Figure 1:
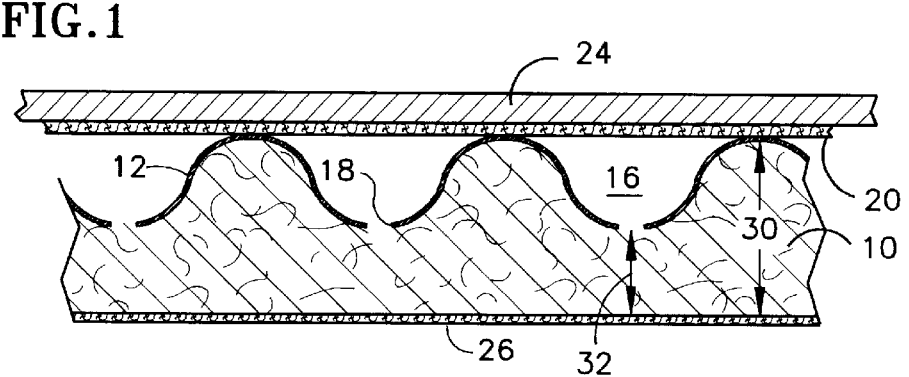
FIG. 1 is a cross-sectional, fragmentary view of part of an acoustical headliner according to one embodiment of the invention.
Figure 2:
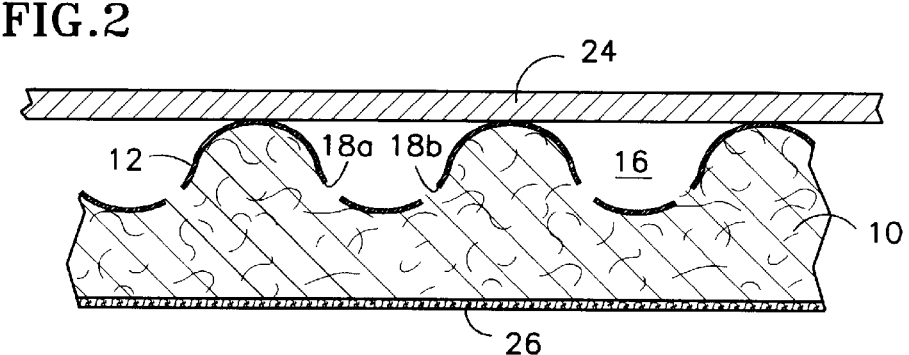
FIG. 2 is a cross-sectional, fragmentary view of part of an acoustical headliner according to one embodiment of the invention with the embossed support member attached directly to the roof to form the resonators.

Referring now to FIGS. 1 and 2, there is shown a vehicle headliner according to the invention. As shown, the headliner comprises a bulk layer (10) attached to one side of a support member (12). The support member (12) is embossed with a pattern of hemispheres forming a plurality of resonator cavities (16). The resonator cavities (16) are open to the side of the support member (12) opposite the bulk layer (10) and have a specific volume. An orifice (18) having a predetermined diameter or area is provided within the support member (12) and communicates with each resonator cavity (16). A backing sheet (20) is attached to the opposite side of the support member (12) and covers each of the resonator cavities (16). The backing sheet (20), together with the cavities (16) and the orifices (or holes) (18), form a plurality of Helmholtz resonators (22) (see FIG. 4). The resonators (22) absorb low frequency noise which pass through the bulk layer (10) and enter the resonators via the orifices (18).

The low frequency noise absorbed by the resonators (22) is typically below about 1000 Hertz (Hz), for example. Such noise may originate from any one of several sources inside the vehicle, for instance, from the engine compartment and/or the defroster fan. Meanwhile, high frequency noise entering the headliner is generally attenuated by the bulk layer (10). This higher frequency noise typically ranges from about 1000 Hz to about 20,000 Hz and may originate from any one of several other sources such as wind noise, brake squeal and tire noise.

The bulk layer (10) functions to absorb high frequency noise (sound waves) passing through the facing sheet (26) and also passing through the roof (24) and/or the backing sheet (20). Generally, this layer should have a sufficiently low impedance such that the sound waves are not reflected out of the headliner, and preferably an impedance only slightly greater than that of the facing sheet (26).

The frequency of the noise actually absorbed by the bulk layer (10) depends upon the density and thickness of the layer. As the thickness of the bulk layer increases, the frequency of the absorbable sound waves decreases. Therefore, one embodiment comprises varying the thickness of the bulk layer across the headliner based upon the sound frequency in that area of the vehicle. It is preferred to maintain the thickness of the bulk layer (10) to a minimum in order to reduce or limit the overall thickness and weight of the headliner. Yet, the bulk layer (10) can have an overall thickness greater than the depth of the resonant cavities (16) such that, during manufacture, the bulk layer (10) can be compressed by the support member (12) to substantially fill the spaces or valleys between adjacent cavities. Consequently, the thickness of the bulk layer (10) is a function of the frequency of the sound waves to be absorbed, the cost of the bulk layer materials, and, in vehicles, space limitations. Generally, the thickness of the bulk layer (10) varies from about 5 millimeters (mm) to about 25 mm.

The bulk layer (10) is preferably composed of acoustically absorbent material such as a fibrous material typically having a density of about 2 (pounds per cubic foot (lbs/ft$^3$)) to about 5 lbs/ft$^3$. Possible bulk layer compositions include any number of fibrous materials such as polyester fiber, fiberglass, glass fiber mat (mixture of glass fiber and polyolefin fiber), polyester felt, and acoustical foam, among others, with the preferred material typically chosen based upon recyclability.

The facing sheet (26) is disposed adjacent to the bulk layer (10) and serves primarily to separate the bulk layer from the cabin and to provide a pleasant aesthetic appearance to the liner. The facing sheet also serves to provide structural integrity to the headliner while minimizing the impedance change from the cabin environment into the liner. The hardness of this facing sheet is a function of both the desired impedance difference between the environment and the headliner, and a hardness which provides sufficient structural integrity to allow the headliner to be self-supporting under typical environmental conditions, and to enable normal contact without puncturing.

The desired facing sheet impedance should be chosen so as to best facilitate movement of the sound waves into the headliner. Entry of the sound waves into the headliner can be further enhanced by providing perforations within the facing sheet (26). The thickness of the facing sheet (26) is typically up to about 3 mm, with about 1 mm to about 2 mm common, depending upon the particular utilization. Suitable materials for the facing sheet include polyester fiber, vinyl, and foam backed fabric, among others.

As with the facing sheet (26), the support member (12) serves a dual purpose. The support member (12) incorporates a plurality of resonant cavities (16) into the headliner and also acts as a support to add strength and rigidity to the headliner. The support member (12), which may be embossed by any conventional thermal forming process and which has a thickness up to about 5 mm, with about 1 mm to about 2 mm preferred, should be composed of a material having a density sufficient to prevent the escape of absorbed sound waves. Typically, the density will range from approximately 1.5 grams per cubic centimeter (gm/cm$^3$) to about 2.5 gm/cm$^3$. Possible support member compositions include almost any thermoplastic material, such as polypropylene, polystyrene, thermoplastic polyester, TPU (thermoplastic urethane) and others, or even perforated craft paper such as corrugated paper, for example.

The resonant cavities should be designed such that the wavelength of the particular sound or noise to be attenuated is significantly longer than the largest dimension of the resonant cavity and to be free of constrictions which essentially divide the resonant cavity into separate volumes. Typically, the resonant cavities, for example, can be in the shape of a hemisphere, rectangle, cube, pyramid, polyhedron, polygon, or other structurally rigid embossment, with cavities having a slightly flattened top surface preferred due to ease of attaching the embossed sheet to the backing sheet or roof. Within the thickness restrictions of vehicle headliners, however, the rectangular type cavities, such as "L" shaped polygons and others, which are longer and therefore have greater volume, can be employed to reach lower frequencies than attainable with hemispherical type cavities.

Figure 4:
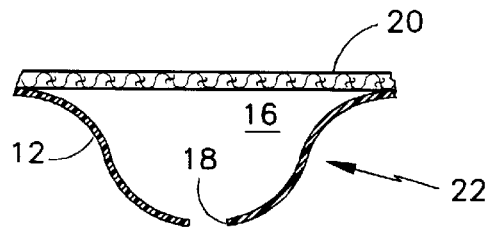
FIG. 4 is a cross-sectional view of a single resonator according to the present invention.

The backing sheet (20), which is applied to the opposite side of the support member (12), closes off the plurality of resonant cavities (16), forming, together with the resonant cavities (16) and the orifices (18), a plurality of resonators (22) (see FIG. 4). Aside from forming the flat side of each resonance chamber, the backing sheet (20) provides structural integrity to the headliner, a means for attaching the headliner to the roof of the cabin, and also a means of preventing the release of the absorbed sound waves. The backing sheet (20) is attached to the roof (24) of the vehicle cabin, for example, by a suitable bonding method, such as clips, velcro strips, a spray adhesive, a thermoplastic film, or similar method.

The backing sheet (20) can be made from any material having sufficient structural integrity to support the support member (12) and which is compatible with and readily bonds to the roof (24) of the cabin. Possible materials include perforated craft paper, such as corrugated paper, and thermoplastic materials, such as polypropylene, polystyrene, thermoplastic polyester, and TPU (thermoplastic urethane), among other materials. As with the size of the facing sheet, bulk layer, and support member, the thickness of the backing sheet is a function of the desired strength, and size and weight restrictions of the headliner. Typically, the backing sheet has a thickness of up to about 3 mm, with about 0.5 mm to about 2 mm preferred, and about 1 mm especially preferred for use in an automobile headliner.

Each resonator (22), formed by the backing sheet (20), support member (12), and orifice(s) (18), has a resonant frequency set by its geometry including: the resonant cavity volume; the orifice diameter or area; and the thickness of the support member at the orifice location, according to the following equation:

$$f = \left(\frac{c}{2\pi}\right)\sqrt{\frac{A}{Vt'}} \quad \text{(Equation 1)}$$

where
f=resonance frequency
c=thermodynamic sound speed
A=$\pi d^2/4$, hole area
V=resonant cavity volume
t'=t+0.8$\sqrt{A}$, effective sheet thickness FIG. 2 shows another embodiment of a headliner according to the invention wherein each of the resonators (22) is provided with a multiplicity of orifices, there being two such orifices (18a) and (18b) shown in the drawing. The multiplicity of orifices may be located in different portions of the resonators (22), i.e., at or near the top of the resonant cavities (16) or on opposite sides as shown in the illustrated embodiment. The preferred number of orifices is based upon the size of the resonant cavity (16) and the desired tuned frequency of the resonator (22). Preferably, in an automobile headliner where the width of the resonant cavity (16) is about 22 mm or less, the height is about 10 mm, the number of orifices employed will be less than about 4 and should be spaced substantially equally apart from one another.

The Equation 1 set forth hereinabove is written for a resonator employing a single orifice (18). However, Equation 1 can be readily modified to cover multiple orifices (each of the same diameter) as follows:

$$f = \left(\frac{c}{2\pi}\right)\sqrt{\frac{nA}{Vt'}} \quad \text{(Equation 2)}$$

where
n=number of orifices employed.

The resonance frequency of the resonant chamber is proportional to the area of the orifice and will increase as the square root of the orifice area. With respect to the tuned frequency, it actually makes little or no difference whether one large orifice or a number of small orifices having the same total area are employed, except for the effect that the orifice area has on the effective sheet thickness in Equation 2 since t'=t+0.8$\sqrt{A}$.

Figure 7:
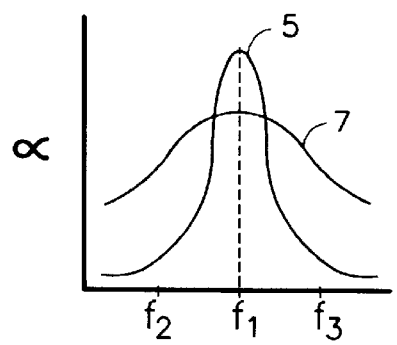
FIG. 7 is a graph of the absorption coefficient of a resonator chamber with low acoustical damping versus one with high acoustical damping.

The number of orifices, however, does affect the absorption characteristics of a resonator. This effect is best illustrated by reference to FIG. 7 wherein two characteristic curves (5) and (7) are shown, curve (5) representing the absorption coefficient, $\alpha$, for a resonator having a single orifice and curve (7) representing $\alpha$ for essentially the same resonator having a multiplicity of smaller orifices which have the same total area as the single hole for the resonator having characteristic curve (5). It will be seen that while both resonators are tuned to the same frequency $f_1$, $\alpha$ of the resonator represented by curve (5) is substantially higher than that represented by curve (7). It will be also seen that while both resonators resonate at the same frequency, $\alpha$ of the resonator represented by curve (7) is higher than $\alpha$ represented by curve (5) when the two resonators are exposed to noise at off-resonant frequencies, say $f_2$ and $f_3$. Thus, the use of multiple orifices within the resonator adds additional losses and results in a lower quality factor ("Q") resonator, wherein Q is the measurement of sharpness of the resonance. The resonator with the single orifice has a higher Q and results in higher attenuation at specific resonant frequencies while exhibiting lower attenuation at off-resonance frequencies.

Figure 3:
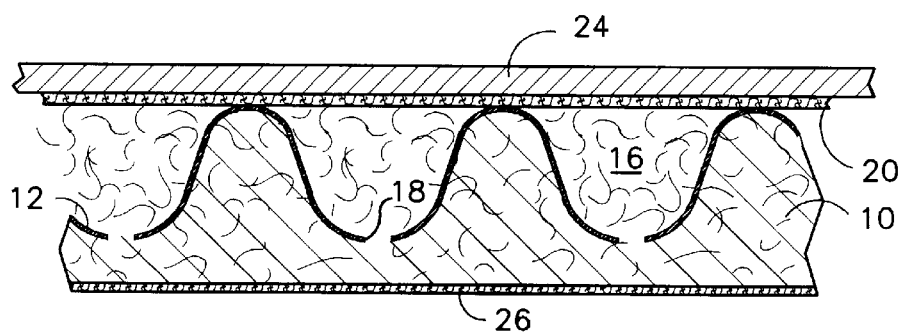
FIG. 3 is a cross-sectional, fragmentary view of an acoustical headliner according to another embodiment of the invention.

It should be noted that Q for the resonator could also be lowered by placing acoustically absorbent material, such as polyester fiber within the resonant cavity (see FIG. 3). The acoustically absorbent material will increase losses within the cavity and lower the Q of the resonator. Thus the cavity will become a broadband resonator having a lower absorption coefficient at its tuned frequency but high absorption at off-resonant conditions, as represented by curve (7) in FIG. 7.

Another factor which should be considered with respect to acoustic attenuation is impedance which relates to the flow resistance through the headliner. Flow resistance is related to the pressure drop sustained by an acoustic wave passing through the headliner, and is defined by the following equation:

$$R = \frac{\Delta P}{u} \quad \text{(Equation 3)}$$

where
R=flow resistance
$\Delta P$=acoustic pressure drop across the headliner
u=acoustic particle velocity
acoustic particle velocity for a plane wave is defined as:

$$u = \frac{p}{\rho c} \quad \text{(Equation 4)}$$

where
p=acoustic pressure
c=thermodynamic speed of sound
$\rho$=density of air
$\rho c$=flow resistance of air=406 mks (meters, kilogram seconds) rayls Flow resistance is often specified as n×$\rho$c, which means that the headliner has n times the resistance of air. Conventionally, acousticians refer to 2 $\rho$c liners, 3 $\rho$c liners, etc. Typically a flow resistance of up to about 1 ρc per inch is acceptable, with approximately 0.5 ρc per inch typically preferred.

An important feature of the invention is, of course, the provision of a sound attenuating device and particularly a vehicle, such as an automobile, headliner, which can control sound energy or noise at different frequencies. This feature is probably best illustrated by reference to FIGS. 5 and 6 which show the absorption coefficient versus the frequency for a conventional headliner and headliners constructed according to the invention.

Figure 5:
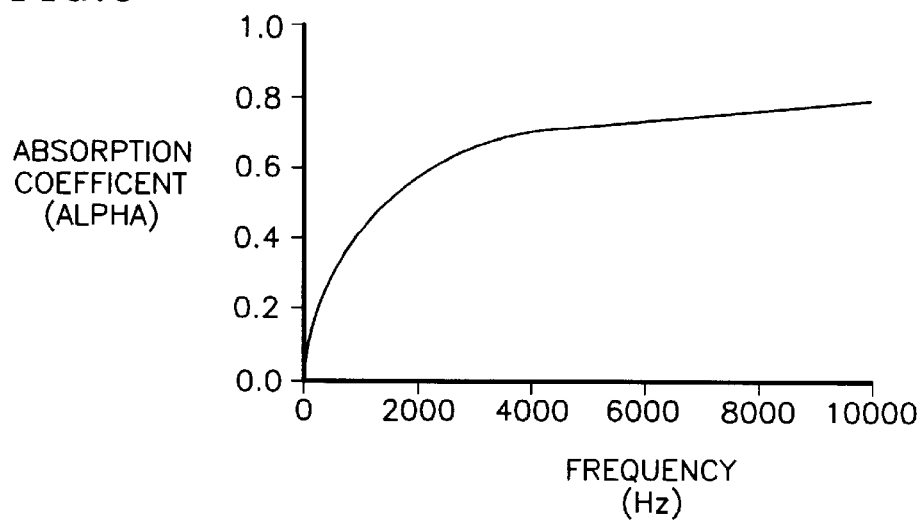
FIG. 5 is a graph showing the performance of a conventional headliner.
Figure 6:
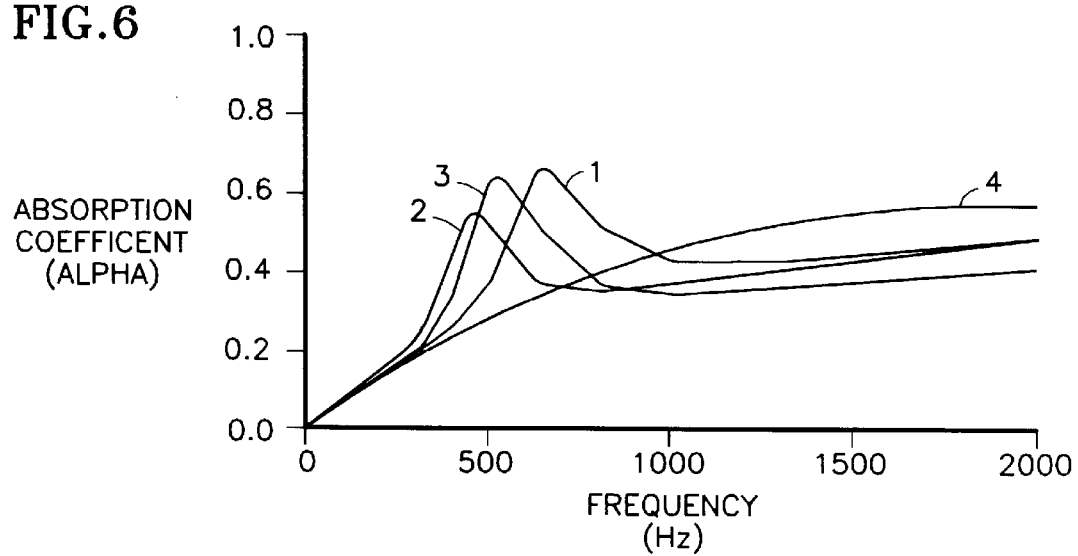
FIG. 6 is a graph showing the performance of a headliner according to the invention as compared to a conventional headliner.

The conventional headliner, represented by FIG. 5 and curve 4 in FIG. 6, employed a backing sheet having a density of 1.5 g/cm$^3$ and a thickness of 1 mm, and a single bulk layer composed of polyester fibers. The bulk layer had a thickness of 19 mm and a flow resistance of 0.25 ρc.

The headliners of the invention employed a bulk layer with a thickness of 19 mm at the thickest point and 9 mm at the narrowest point and a flow resistance of 0.25 ρc, a plastic sheet, 1 mm thick, embossed with a plurality of hemispherical cavities, and a backing sheet. The backing sheet, which was 1 mm thick and had a density of 1.5 g/cm$^3$, was placed over the support member to close each one of the cavities, forming a plurality of hemispherical resonators having a height of 9 mm (except for curve 3 on FIG. 6). One of the headliners, represented by curve 1 on FIG. 6, had 9 mm high resonators with 0.25% open area, each having 1 orifice with a diameter of 0.5 mm, wherein the open area refers to the total area of the holes in a give resonator with respect to the total area of the top side of the resonator (i.e. that portion represented by sheet 12 in FIG. 4). Another headliner, represented by curve 2 on FIG. 6, had 9 mm high resonators with 0.125% open area, each having 1 orifice with a diameter of 0.5 mm. Yet another headliner of the present invention, represented by curve 3 on FIG. 6, had 13.5 mm high resonators with 0.25% open area, each having 1 orifice with a diameter of 0.5 mm.

The headliners were analyzed over a frequency range from 0 hertz (Hz) to 10,000 Hz and the absorption coefficient was calculated for the headliners over the frequency range. It will be seen in the case of the conventional headliner that the absorption coefficient gradually increases in a smooth transition over the lower frequencies up to about 4000 Hertz and levels off at an absorption coefficient of about 0.7. (see FIG. 5)

FIG. 6 shows the results of the headliners according to the invention, curves (1–3), when subjected to the same frequency range compared to the results for a conventional headliner, curve 4. The headliner of the invention, exhibits a sharp increase in the absorption coefficient up to about 0.7 at very low frequencies of less than about 500 Hz. This is the tuned resonant frequency of the resonators as indicated by the peaks in the curves 1, 2, and 3, of FIG. 6. Note that the absorption coefficient peaks of each of the curves 1, 2, and 3 is significantly higher than the absorption coefficient for the conventional headliner in the 500 Hz range, while at the higher frequencies, the absorption coefficient behaves very similarly to the conventional headliner.

The acoustical resonators of the present invention can be tuned across the device such that different areas of the device are capable of attenuating different frequency noises. Consequently, in an automobile for example, the headliner will be capable of attenuating the appropriate frequency noise in that area of the cabin to maximize the noise attenuation capabilities of the headliner. Conventional headliners address high frequency noises while the present invention will attenuate substantially all of the noises within the cabin. Additionally, the device of the present invention can be produced with recyclable material, thereby meeting environmental concerns.

It will be understood that various modifications may be made to the embodiments disclosed herein. Therefore, the above description should not be construed as limiting, but merely as examples of the preferred embodiments. Those skilled in the art will envision other modifications within the scope and spirit of the claims appended hereto.

What is claimed is:

1. An acoustical attenuating device, comprising:
   a) a bulk layer;
   b) a backing layer;
   c) a support member disposed between and attached to said bulk layer and said backing layer, said support member having a plurality of discrete open cavities formed in a surface thereof and each cavity having at least one orifice therein; and
   d) a plurality of resonators for absorbing sound, said resonators defined by said cavities with said orifice, enclosed by said backing layer, each resonator having a geometry which determines a resonant frequency therefor, at least some of said resonator geometries being structured to provide enhanced sound absorption in the range below about 1,000 Hz.

2. The acoustical attenuating device of claim 1, wherein said bulk layer is composed of a fibrous material.

3. The acoustical attenuating device of claim 1, wherein said support member and said backing layer are a thermoplastic material or craft paper.

4. The acoustical attenuating device of claim 1 wherein said support member and said backing layer are polypropylene, polystyrene, thermoplastic polyester, or thermoplastic urethane.

5. The acoustical attenuating device of claim 1, wherein said bulk layer attenuates sound energy within a first frequency range; and said resonators attenuate sound energy at a second frequency.

6. The acoustical attenuating device of claim 1, wherein said bulk layer attenuates sound energy within a first frequency range; and a first portion of said resonators in a first area of the device attenuate sound energy at a second frequency and a second portion of said resonators in a second area of the device attenuate sound energy at a third frequency.

7. The acoustical attenuating device of claim 1, each of said resonators has a volume-orifice combination such that said resonators are tuned to attenuate sound energy in a range of frequencies.

8. The acoustical attenuating device of claim 1, wherein acoustically absorbent material is located within said cavities.

9. The acoustical attenuating device of claim 1, wherein said cavities have a substantally hemispherical, rectangular, cubical, pyramidal, polyhedral, or polygonal shape.

10. A vehicle headliner, comprising:
   a) a bulk layer;
   b) a support member attached to said bulk layer, said support member having a plurality of discrete open cavities embossed in a surface thereof, each cavity having an orifice connecting said cavity to said bulk layer; and
   c) a backing means connected to said support member, closing said cavities to form a plurality of resonators, each resonator having a geometry which determines a resonant frequency therefor, at least some of said resonator geometries being structured to provide enhanced sound absorption in the range below about 1,000 Hz.

11. A vehicle headliner as in claim 10, wherein said cavities have a substantally hemispherical, rectangular, cubical, pyramidal, polyhedral, or polygonal shape.

12. A vehicle headliner as in claim 10 wherein said backing member is a sheet or the roof of the vehicle.

13. A vehicle headliner as in claim 10 wherein each of said resonators has a volume-orifice combination such that said resonators are tuned to attenuate sound in a range of frequencies.

14. A vehicle headliner as in claim 13, wherein a portion of said resonators are tuned to absorb a particular frequency of sound depending upon location of said portion of said resonators within the vehicle.

15. A vehicle headliner as in claim 10 wherein said backing means and support member is a thermoplastic material or craft paper.

16. A vehicle headliner as in claim 10 wherein said support member is polypropylene, polystyrene, thermoplastic polyester, or thermoplastic urethane.

17. The acoustical attenuating device of claim 5, wherein said second frequency at which said resonators attenuate sound energy is below about 500 Hz.

18. The acoustical attenuating device of claim 7, wherein said volume-orifice combination of each resonator includes the volume of the cavity and the area of the orifice or orifices.

19. A vehicle headliner as in claim 13, wherein said volume-orifice combination of each resonator includes the volume of the cavity and the area of the orifice or orifices.

20. A vehicle headliner as in claim 11, wherein the support member is formed of sheet material contoured to create said cavities in one surface thereof and thereby resulting in adjacent depressions in the opposite surface of the support member between and adjacent to the cavities and wherein the bulk layer occupies substantially the entire depth of the depressions in said opposite surface of the support member.

* * * * *